US006357390B1

(12) United States Patent
Maehata et al.

(10) Patent No.: US 6,357,390 B1
(45) Date of Patent: Mar. 19, 2002

(54) ELECTRIC SCREEN DEVICE

(75) Inventors: Hidehiko Maehata; Masanori Tsukahara; Daisuke Tamakoshi; Tomohiko Suzaki; Yutaka Isawa, all of Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/423,590

(22) PCT Filed: Mar. 19, 1998

(86) PCT No.: PCT/JP98/01203

§ 371 Date: Nov. 11, 1999

§ 102(e) Date: Nov. 11, 1999

(87) PCT Pub. No.: WO98/52387

PCT Pub. Date: Nov. 19, 1998

(30) Foreign Application Priority Data

May 16, 1997 (JP) ............................................. 9-126143

(51) Int. Cl.[7] ........................ A01K 61/00; A01M 29/00

(52) U.S. Cl. ....................................................... 119/220

(58) Field of Search ............................. 119/220; 43/98, 43/112, 100

(56) References Cited

U.S. PATENT DOCUMENTS 4,211,980 A * 7/1980 Stowell ........................ 455/40
4,580,525 A 4/1986 Marzluf
4,750,451 A 6/1988 Smith
4,825,810 A * 5/1989 Sharber ....................... 119/220
5,327,854 A * 7/1994 Smith et al. ................ 119/220
5,445,111 A * 8/1995 Smith .......................... 119/220
5,448,968 A * 9/1995 Ostile .......................... 119/220
5,460,123 A * 10/1995 Kolz .......................... 119/220
5,566,643 A * 10/1996 Charter et al. .............. 119/220

FOREIGN PATENT DOCUMENTS

JP 7-82914 9/1995

OTHER PUBLICATIONS

The Piping Engineering, vol. 38, No. 8 (1996) Masanori Tsukahara "System for Preventing Fish from Entering by Means of Electric Screen (in Japanese)", p. 1–6.

Proceedings of the Institute of Electrostatics Japan, vol. 20, No. 2 (1996) Hidehiko Maehata "Underwater Fence Electric Screen (in Japanese)", p. 62–67.

The Technical Research Center of the Kansai Electric Power Co., Inc., vol. 50 (1994), p. 131–191.

The Hitachi Zosen Technical Review, vol. 54, No. 2 (1993), p. 141–145.

R & D News Kansai, No. 306 (1993), p. 6–7.

* cited by examiner

*Primary Examiner*—Michael J. Carone
*Assistant Examiner*—Son T. Nguyen
(74) *Attorney, Agent, or Firm*—D. Peter Hochberg; Katherine R. Vieyra; William H. Holt

(57) ABSTRACT

An electric screen device for preventing creatures from intruding into a water channel, which comprises a pair of opposed electrode assemblies disposed on opposite sides of a water intake channel, and a dc pulse applying device 13 for applying dc pulses between the electrode assemblies. In such electric screen device, the product of the peak value of the intensity of an electric field produced between the electrode assemblies by the dc pulse applying device and the body length of creatures to be prevented from intrusion into the water channel is not less than 0.1 V, the dc pulse applying time is within the range of 2–200 msec, and the duty factor of the dc pulse is not more than 0.5.

2 Claims, 4 Drawing Sheets

ELECTRIC SCREEN DEVICE

TECHNICAL FIELD

The present invention relates to an electric screen device for preventing creatures, such as fishes and shellfishes, from intruding into a water intake port, i.e., a water intake channel or the like in a power plant or the like.

BACKGROUND ART

To prevent creatures, such as fishes and shellfishes, from intruding into a water intake port in a power plant, a water intake channel is provided with an electric screen device.

Conventionally, this electric screen device comprises a pair of opposed electrode assemblies disposed on opposite side walls of the water intake channel, and a voltage applying device for applying dc or ac voltage between said electrode assemblies at predetermined intervals of time.

Thus, an electric screen is formed by a predetermined voltage applied between said electrode assemblies at predetermined intervals of time by the voltage applying device.

The applied voltage is of a value such that the product of the peak value of the intensity of an electric field and the voltage applying time (on-time) is not less than 0.01 V sec/cm, and the off-time is set within the range of 0.5–3 sec. Empirically, it has been so set for the case of sweetfish of 10 cm length that the peak value of the electric field intensity is 0.08 V/cm and the on-time and off-time are respectively 2 sec.

According to the electric screen device described above, however, the off-time is relatively long, which fact is preferable from the viewpoint of power saving but poses a problem that it permits intrusion of creatures.

Accordingly, it is an object of the invention to provide an electric screen device which is designed to save power and to reliably prevent intrusion of creatures.

DISCLOSURE OF INVENTION

An electric screen device according to the present invention comprises a pair of opposed electrode assemblies disposed on opposite sides of a water channel, and a dc pulse applying device for applying dc pulse voltage between said electrode assemblies to prevent creatures from intruding into the water channel, said electric screen device being characterized in that the product of the peak value of the field intensity (voltage per unit of length) of an electric field produced between said electrode assemblies by said dc pulse applying device and the body length (unit of length) of creatures to be prevented from intrusion into the water channel is not less than 0.1 V and in that the dc pulse applying time is within 2–200 msec. Further, in the above arrangement, the duty factor of the dc pulses is not more than 0.5.

According to the above arrangement, since the product of the peak value of the intensity of the electric field produced between the electrode assemblies disposed on opposite sides of the water channel and the body length of creatures to be prevented from intrusion is not less than 0.1 V, and since the dc pulse applying time is within the range of 2–200 msec, intrusion of the creatures can be efficiently prevented.

BEST MODE FOR EMBODYING THE INVENTION

The invention will now be described in more detail with reference to the accompanying drawings.

Figure 1:
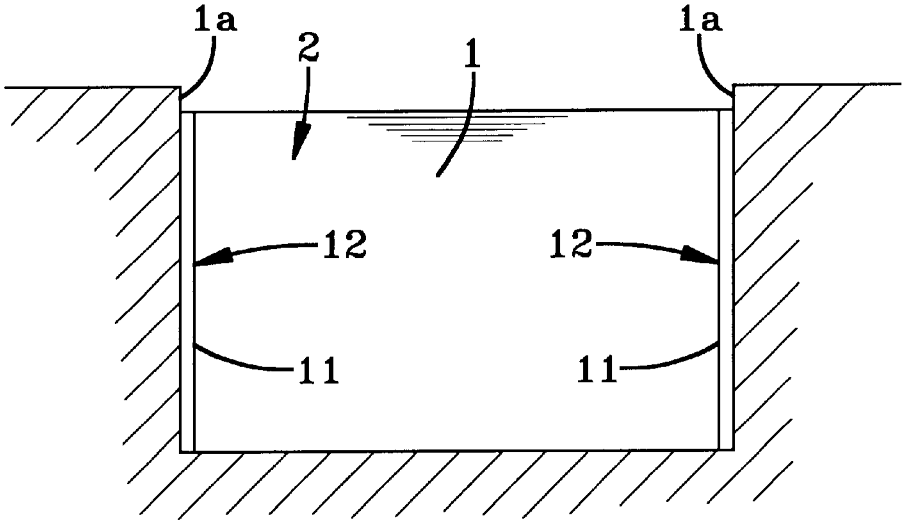
FIG. 1 is a sectional view of a water intake channel provided with a preferable electric screen device according to the present invention.
Figure 2:
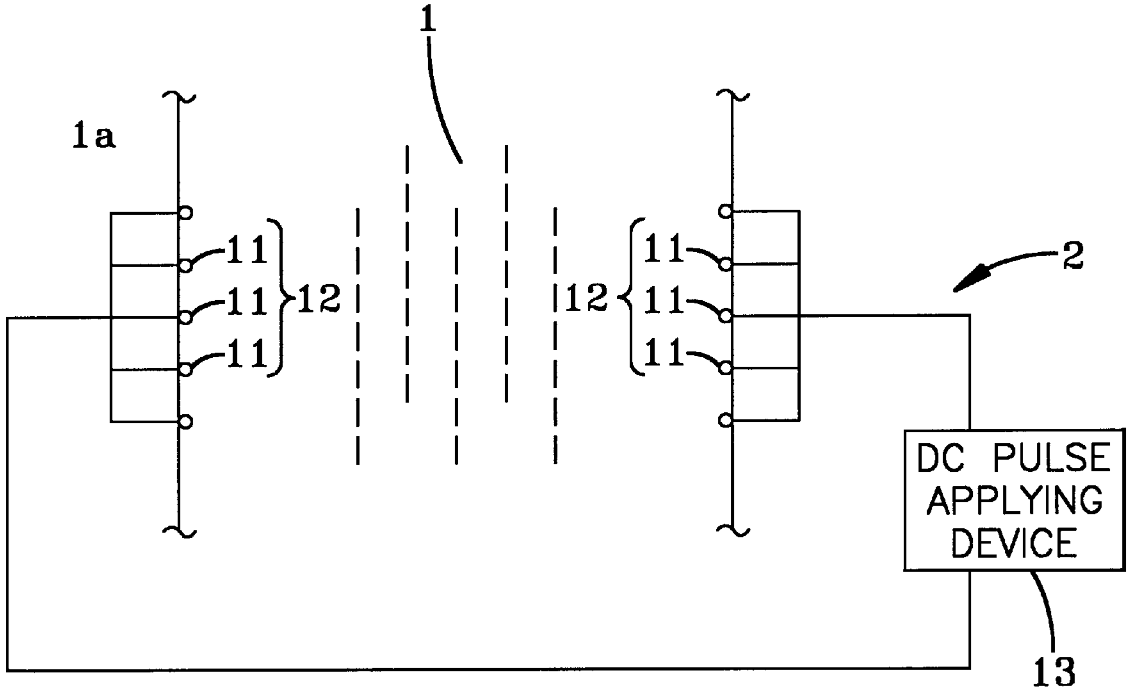
FIG. 2 is a plan view of the water intake channel provided with said electric screen device.

FIG. 1 is a sectional view of a water intake channel provided with an electric screen device, and FIG. 2 is a plan view thereof.

As shown in FIGS. 1 and 2, the numeral 1 denotes a water intake channel leading to a port for taking in cooling water, e.g., in a power plant, with an electric screen device 2 installed somewhere between the ends of said channel.

This electric screen device 2 comprises a pair of electrode assemblies 12, 12 disposed on opposite side walls la of the water intake channel 1, each assembly being composed of a plurality of electrode rods 11 disposed at predetermined intervals, and a dc pulse applying device 13 for applying dc pulses between said electrode assemblies 12, 12 under a predetermined voltage and at predetermined intervals of time. Further, the electrode rods 11 are vertically installed.

Figure 3:
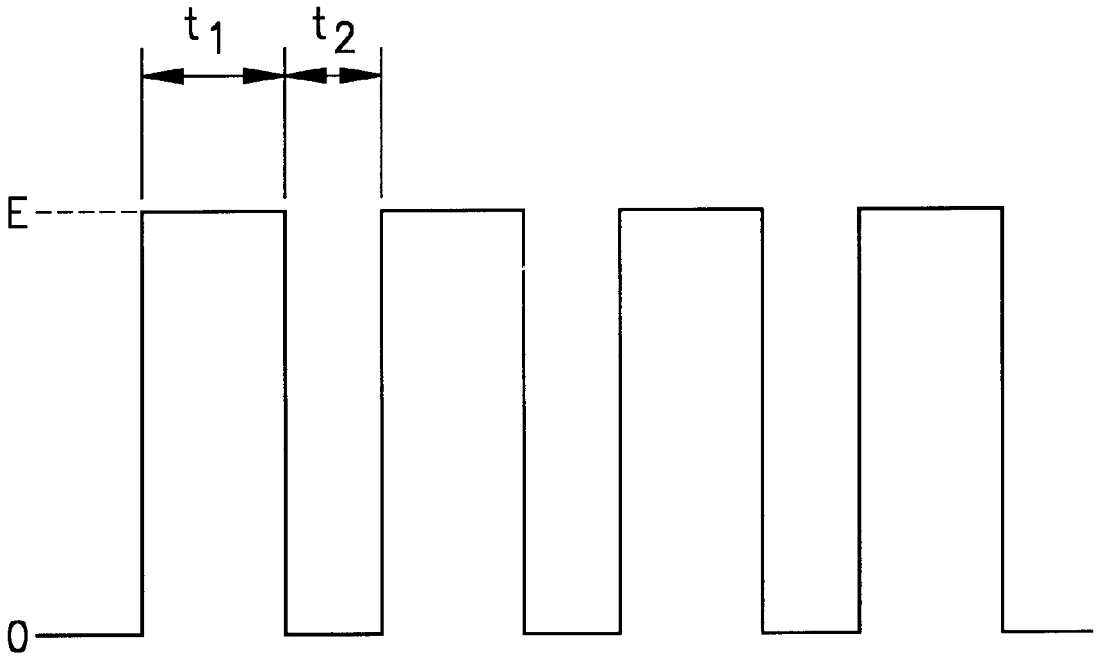
FIG. 3 is a waveform diagram of dc pulses to be applied by said electric screen device.

And dc pulses as shown in FIG. 3 are applied to said dc pulse applying device 13. The application of these dc pulses is such that the product of the peak value F of the intensity of an electric field produced between said electrode assemblies 12, 12 and the body length L of creatures to be prevented from intrusion into the water intake channel 1 is not less than 0.1 V, and that the on-time (the dc pulse applying time) is within 2–200 msec. In other words, the product of the peak intensity and the body length can be expressed in terms of units as V/cm×cm=V, and according to the invention the magnitude of the intensity and of the length of the creatures is not less than 0.1 V. In FIG. 3, $t_1$ is the on-time and $t_2$ is the off-time.

Figure 4:
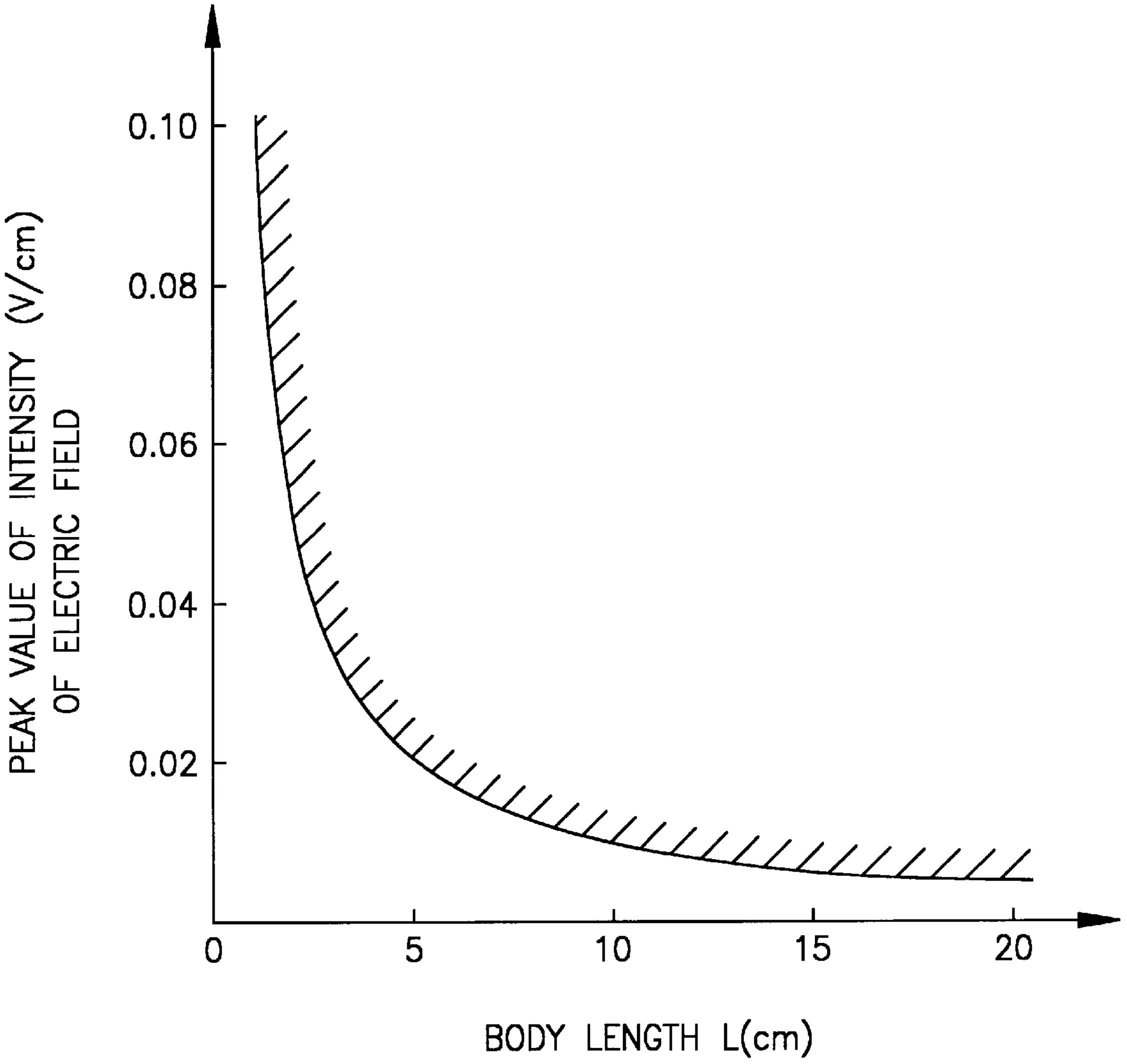
FIG. 4 is a graph showing the relationship between the peak value of the intensity of an electric field, which value indicates the paralysis limit of creatures, and the body length of creatures to be prevented from intrusion.

Based on the curve found by investigating the electric shock region for creatures shown in FIG. 4 (the region being shaded), it is determined that the product of the peak value E of the intensity of the electric field and the body length L of the creatures should be in the range of not less than 0.1 V.

Figure 5:
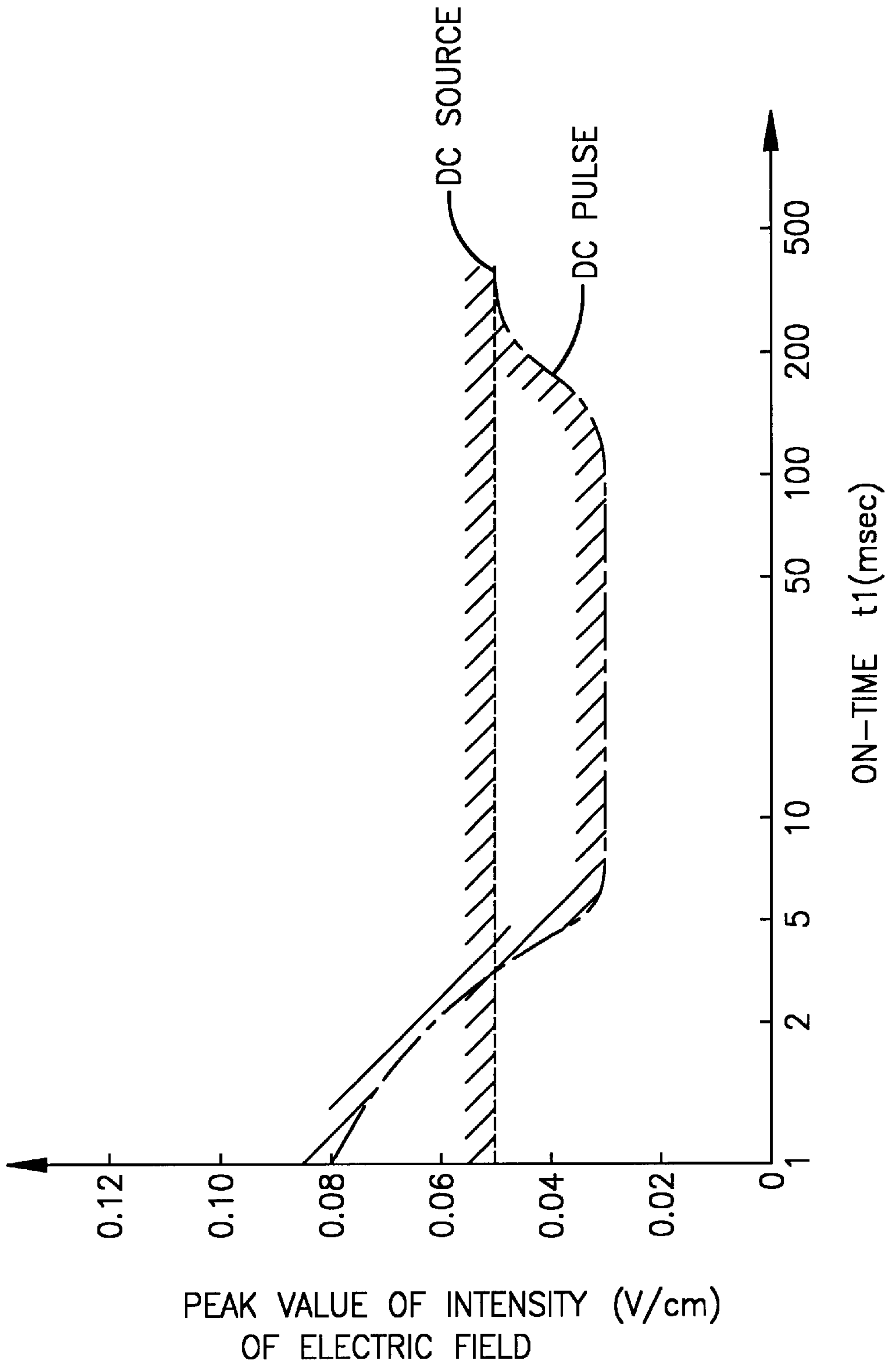
FIG. 5 is a graph showing the relationship between the peak value of the intensity of the electric field, at which value creatures show abhorrence, and the on-time.

Further, it is determined that the on-time for dc pulses should be within the range of 2–200 msec on the basis of the results of an investigation of the limit at which the creatures (e.g., sweetfish, crucian carps, carps, etc.) show abhorrence of electric stimulus, as shown in FIG. 5.

FIG. 5 shows that in the case where the body length of creatures such as fish is 10 cm and the duty factor expressed by on-time divided by (on-time+off-time) is 0.2, the proper range of the on-time $t_1$, in which the creatures show their abhorrence is 2–200 msec.

Stated in more detail, if the on-time $t_1$ is shorter than 2 msec, the peak value of the electric field intensity is required to be higher than that when the dc source is used, thus, this is disadvantageous. Further, if the on-time $t_1$, is longer than 200 msec, there arises no difference from the case where the dc source is used, which means that the effects of pulses are lost. That is, the result is a discontinuous electric screen rather than in the form of pulses, permitting creatures to intrude. Therefore, the limit of the on-time $t_1$ should be 200 msec.

The above description has been given with reference to the case where the duty factor is 0.2. In the case where the interval between adjacent pulses is longer, a value greater than 0.5 may be employed, though 0.5 or less is preferable.

Further, in the above embodiment, the electric screen device has been described with reference to the case where it is installed in a water intake channel in a power plant. However, it may be installed in a water discharge channel. Further, it may be installed in either water intake channel or water discharge channel in a water control system.

According to such electric screen device, since the product of the peak value of the intensity of the electric field produced between the pair of electrode assemblies disposed on opposite sides of the water channel and the body length of creatures to be prevented from intrusion is not less than 0.1 V, and since the dc pulse applying time is within the range of 2–200 msec, the power consumption is less than the case of a conventional device and intrusion of creatures can be efficiently prevented.

INDUSTRIAL APPLICABILITY

As described above, the electric screen device of the invention is installed in the water intake channel leading to the water intake port in a power plant, so that fishes and shellfishes can be reliably prevented from intruding into the water intake channel, thus being very useful.

What is claimed is:

1. An electric screen device for preventing creatures from intruding into a water channel, comprising a pair of opposed electrode assemblies disposed on opposite sides of the water channel, and a dc pulse applying device for applying dc pulses between said electrode assemblies, characterized in that:

the product of the peak value of the intensity of an electric field produced between the electrode assemblies by said dc pulse applying device and the body length of creatures to be prevented from intrusion into the water channel is not less than 0.1 V, and the dc pulse applying time is within the range of 2–200 msec.

2. An electric screen device as set forth in claim 1, wherein the duty factor of each dc pulse is not more than 0.5.

* * * * *